Figure 1:
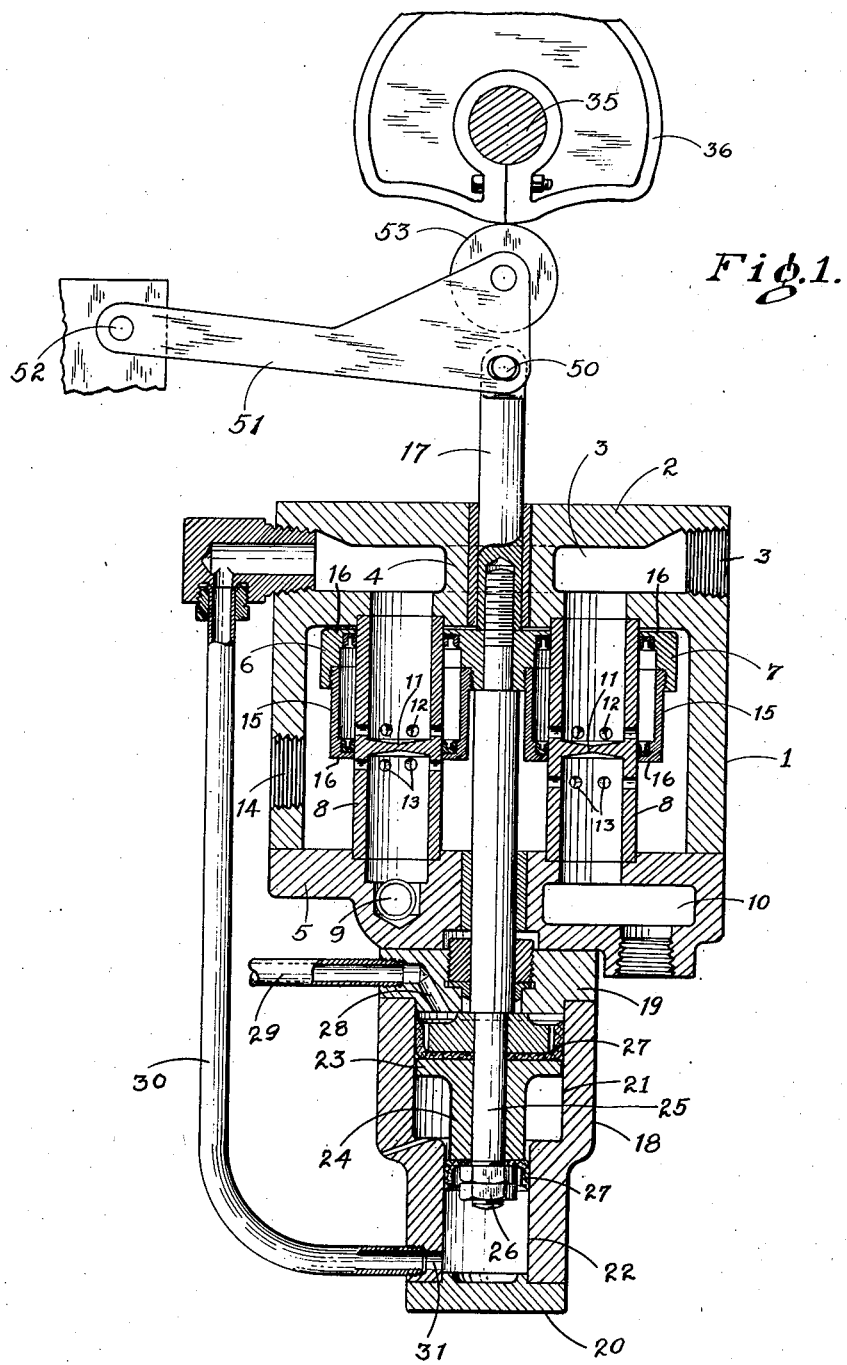

Aug. 6, 1940.  J. H. FRIEDMAN  2,210,236
AIR LOADED VALVE
Filed Oct. 18, 1938  2 Sheets-Sheet 1

INVENTOR.
JOHN H. FRIEDMAN.
BY Richey & Watts
ATTORNEYS

Aug. 6, 1940.          J. H. FRIEDMAN          2,210,236
                       AIR LOADED VALVE
                    Filed Oct. 18, 1938          2 Sheets-Sheet 2
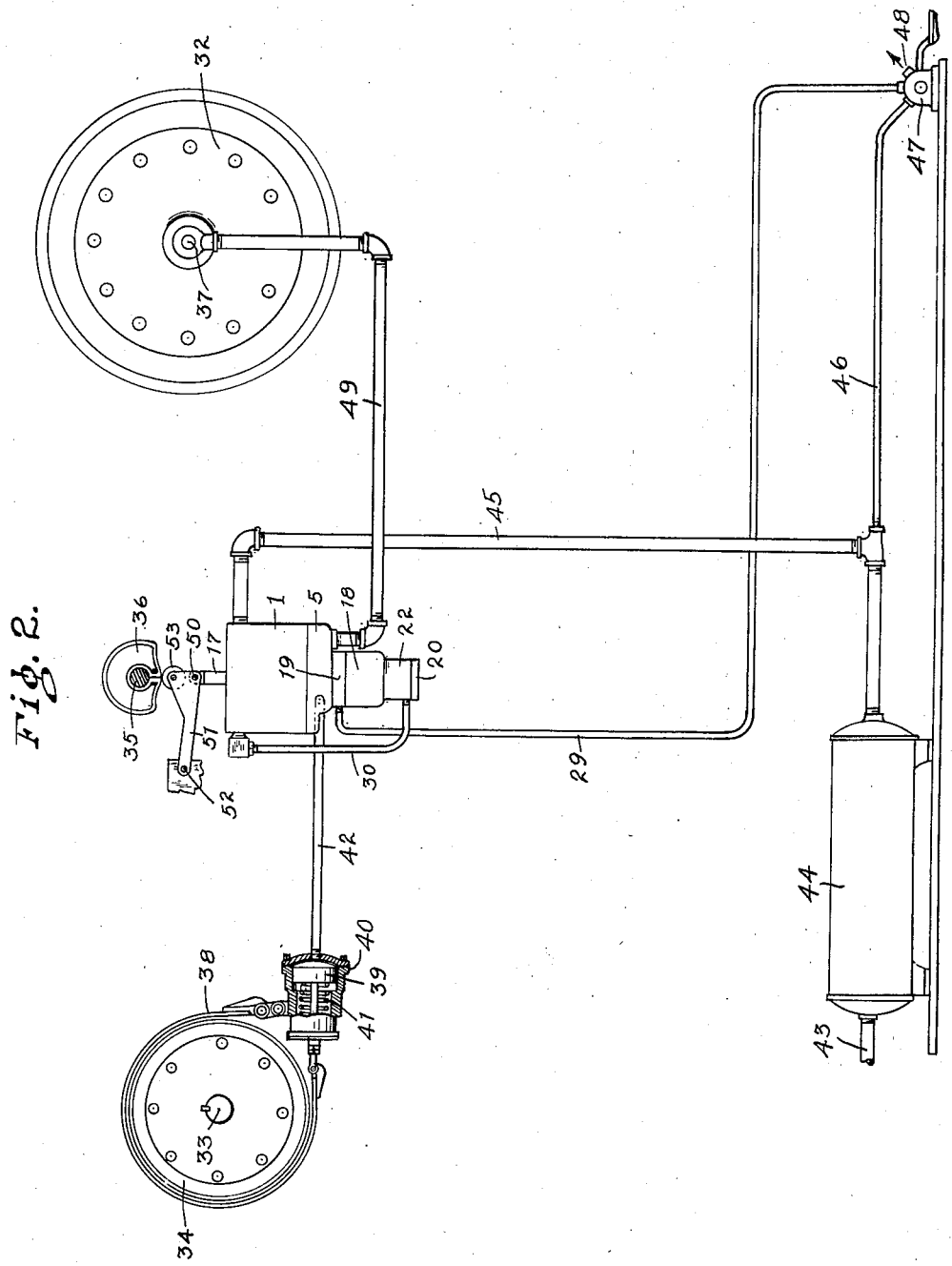

Patented Aug. 6, 1940

2,210,236

UNITED STATES PATENT OFFICE 2,210,236

AIR LOADED VALVE

John H. Friedman, Tiffin, Ohio, assignor to The National Machinery Company, Tiffin, Ohio, a corporation of Ohio Application October 18, 1938, Serial No. 235,699

8 Claims. (Cl. 192—144)

This invention relates to control valves and more particularly to a control valve actuated by a pilot or trip cylinder.

This invention is particularly useful in connection with valves for controlling the clutch and brake of a forging machine, press or the like as disclosed, for example, in the copending application of William L. Clouse, Serial No. 64,530, filed February 18, 1936, or a similar combination in which a valve for controlling pressure fluid is operated by a pressure fluid pilot cylinder controlled in turn by a trip valve.

In such devices the pressure fluid, usually compressed air, is obtained from a shop line or other suitable source of supply and is admitted by operation of the trip valve into the pilot cylinder, which overcomes the force of a return spring and moves the main control valve to admit pressure fluid to the clutch and brake operating cylinders, or other devices to be controlled. In practice many difficulties are encountered with this arrangement, primarily because the available pressure from the shop line or other source of supply varies through a relatively wide range while the action of the spring remains substantially constant. Any increase or decrease of the pressure from the valve for which the size of the piston and strength of the spring were selected changes the rate at which the valve ports are opened or closed, and likewise changes the relative timing of the devices when two or more valves, such as the brake and clutch valves of a forging machine or press, are controlled by the same pilot cylinder.

The principal object of this invention is to provide a pilot or control motor for a control valve or the like in which the returning force against which the valve is moved is maintained at a constant ratio to the actuating force. Another object is to provide an actuating means for a plurality of control valves which open at different times in which the effective actuating force is maintained at such a value during variations in the pressure supply as to maintain the relative timing of the parts controlled by the different valves substantially constant. Other objects and advantages will appear in the following detailed description of the preferred embodiment of this invention.

In the accompanying drawings, Figure 1 is a vertical section through a control valve unit and pilot cylinder, a controlling cam and follower being shown in elevation; and Figure 2 is a diagrammatic layout showing the application of the valve to control the clutch and brake of a forging machine or press.

Referring to the drawings the numeral 1 designates a valve casing or body which houses the control valves and supports the pilot cylinder. As illustrated, the sides of the housing are integral with the top wall 2 which is formed with a cored-out passage 3 extending from one side to the other of the top wall and around a central boss 4. The lower end of the housing 1 is closed by a bottom plate 5.

The unit illustrated embodies two control valves 6 and 7, each of which is a three-way sleeve type compressed air valve. Any desired type of valves may be employed, and the invention is applicable to any desired number of valves. Each of the valves 6 and 7 includes a central tubular member 8 which has its ends seated in opposed rabbets in the lower surface of the top wall 2 and the upper surface of the bottom plate 5 and is firmly clamped in position when the bottom plate 5 is secured to the casing 1. The upper end of each of the tubular members 8 opens directly into the passage 3 formed in the top wall 2. The lower ends of the tubular members 8 of the valves 6 and 7 open into passages 9 and 10, respectively, formed in the bottom wall 5. Each of the tubular members 8 is provided with a central partition 11 and series of ports 12 and 13 above and below the partition, respectively. The interior of the casing 1 is open to atmosphere through a port 14.

A valve sleeve 15 slidably surrounds each of the tubular members 6 and 7. Each sleeve 15 has its central portion spaced from the tubular member upon which it is mounted and is provided with end walls 16 engaging the outer surface of its respective tubular member and carrying suitable packing to prevent escape of pressure fluid. The sleeves 15 in their uppermost positions, as illustrated in the drawings, cover and close the ports 12 in the upper portion of the tubular member 6, leaving the ports 13 open to the interior of the casing 1 and thus to atmosphere through the port 14. When the two sleeves 15 are moved downwardly to their lowermost position they span the partitions 11 and establish communication between the ports 12 and 13 of each valve. The two sleeves 15 are connected to an operating rod or valve stem 17 which is slidably supported in an opening in the boss 4 of the top wall 2 and an aligned opening in the bottom wall 5.

The valve actuating motor comprises two opposed pistons of different areas, the smaller being constantly open to the line pressure and the larger being opened alternately to line pressure and atmosphere by a trip valve. In the illustrated embodiment, a casing 18 is supported below the bottom wall 5 and is provided with upper and lower cover plates 19 and 20. The upper portion of the casing 18 is formed with a cylinder bore 21 and the lower portion with a cylinder bore 22 of smaller diameter. A piston 23 slidably fits within the cylinder bore 21 and is formed with a reduced piston extension 24 slidable within the reduced cylinder bore 22. The valve stem 17 extends through a packed opening in the upper cover plate 19 and is provided with a reduced lower end 25 extending through the pistons 23 and 24. A nut 26 secures the pistons 23 and 24 to the reduced end 25 of the valve stem, and also serves, in the illustrated embodiment, to secure suitable packing 27 to the upper surface of the piston 23 and the lower surface of piston 24.

A port 28 is formed in the upper cover plate 19 opening into the cylinder bore 21 above the piston 23 and communicating with a pipe 29. A conduit 30 is supported by suitable fittings so as to communicate at its upper end with the passage 3 formed in the top wall 2 of the valve casing and at its lower end with a port 31 opening into the lower cylinder bore 22 below the reduced piston 24.

In Figure 2 the control unit is shown arranged to be used to control a forging machine, press or the like, as illustrated in the aforesaid application of Clouse, Serial No. 64,530, filed February 18, 1936. In such machines a combined friction clutch and flywheel 32 is rotatably mounted upon a driven shaft 33, the opposite end of which carries a brake drum 34. The driven shaft 33 is geared to a main shaft 35, one end of which carries a cam 36 which co-operates in controlling the valve mechanism. In Figure 2 these parts are shown developed in order to more clearly illustrate the relation between the valve, the clutch and the brake, although it will be understood that the brake, clutch and cam can be mounted at any desired points in the machine.

The flywheel and friction clutch 33 may be of the construction illustrated in detail in the co-pending application of William L. Clouse, Serial No. 31,251, filed July 13, 1935, to which reference is made for a detailed disclosure of one form of combined flywheel and clutch. The clutch includes friction elements which are arranged to be pressed together to couple the flywheel and clutch casing to the driven shaft when fluid pressure is admitted through a central connection 37 and to be released when the fluid pressure is exhausted through this connection. Ordinarily a motor or other source of power is belted or geared to the flywheel and clutch 32 to continuously rotate the same.

The brake mechanism illustrated embodies a brake band 38 surrounding the drum 34 having its free end connected to a piston 39 reciprocable in a cylinder 40. A spring 41 normally maintains the band 38 tightly engaged about the drum 34 so as to hold the shaft against rotation. When fluid pressure is admitted to the cylinder 40 through the pipe 42 the piston 39 is moved against the pressure of the spring 41 to release the brake band.

Compressed air from a main supply line 43 is preferably conducted first to a reservoir 44 to provide a sufficient volume of compressed air adjacent the machine to prevent excessive fluctuations of the pressure. A supply pipe 45 leads from the reservoir 44 to the passage 3 of the valve housing. A branch pipe 46 leads from the pipe 45 to a trip valve 47, to which is also connected the pipe 29 and an exhaust 48. The trip valve 47 may be any convenient form of three-way valve arranged to connect the pipe 29 with the supply line 46 when depressed and with the exhaust 48 when released. A pipe 49 is connected to the passage 10 in the bottom plate 5 of the valve casing and to the center connection 37 of the friction clutch 32. The pipe 42 leading to the brake releasing cylinder 40 is connected to the passage 9 in the bottom plate 5.

The upper end of the valve stem 17 carries a pin 50 loosely fitting in an opening in a link 51 pivoted at 52 to a portion of the machine frame or the like. The link 51 also carries a roller 53 serving as a cam follower and engaging the periphery of the cam 36.

In the initial position of the parts the combined friction clutch and flywheel 32 is freely rotating upon the driven shaft 33 while the driven elements of the machine are held stationary by the brake band 38. The strip valve 47 is in its released position so that the pipe 29 and the cylinder 21 are open to atmosphere and the fluid pressure in the cylinder 22 holds the valve stem 17 in its uppermost position. When the trip valve 47 is operated pressure fluid is admitted from the supply tank 44 through the pipe 29 to the cylinder 21 which overcomes the pressure in the cylinder 22 and moves the valve stem 17 downwardly. As the valve sleeves 15 move downwardly the ports 13 in the valve 6 are first closed to atmosphere and then placed in communication with the ports 12. Pressure is thereby admitted from the passage 3 through the tubular member 8, the passage 9 and the pipe 42 into the cylinder 40, forcing the piston 39 to move against the spring 41 and release the brake band 38. Further downward movement of the valve stem 17 causes the sleeve 15 of the valve 7 to admit compressed air from the passage 3 through the passage 10, the pipe 49 and the connection 37 to the friction clutch 32, causing engagement of the clutch. The driven elements of the machine are thereby connected to the rotating flywheel and clutch 32 and the machine is set in motion.

The downward movement of the valve stem 17 to open the valves has drawn the roller 53 away from the cam 36. As the shaft 35 starts to rotate the high part of the cam 36 moves into engagement with the roller 53 and holds the valve stem 17 down. While the valve stem 17 is held down by the cam 36 the trip valve 47 is released, exhausting the cylinder 21 to atmosphere so that the roller 53 is pressed against the cam 36 by the pressure in the cylinder 22. When the shaft 35 has completed one revolution the cam 36 permits the valve stem 17 to ride upwardly under the influence of the pressure in the cylinder 22 and close the valves in succession, the two valve sleeves 15 acting first to exhaust the pressure in the friction clutch 32 and then to exhaust the pressure in the brake cylinder 40 permitting the spring 41 to apply the brake and stop the driven elements of the machine with the parts in the relative positions illustrated in the drawings.

It will be apparent that when the reduced piston 24 is forced downwardly by the air pressure admitted above the piston 23 the air contained in the cylinder bore 22 is forced backwardly through the conduit 30 without changing the pressure exerted against the reduced piston 24. A differential between the pressures of the pistons 23 and 24 is always present when pressure fluid is admitted to the upper side of the piston 23 because both cylinder bores are connected to the same source of pressure and the piston 24 has a smaller area than the piston 23, this differential having a ratio to the line pressure which remains constant and which is determined by the relative size of the pistons 23 and 24.

During the opening of the valves any desired relative timing between the points at which the two valves open may be obtained by the relative positions of the ports 13 in the two valves so long as the actuating pressure remains constant. With a given pressure this timing is selected so that as soon as the air pressure has released the brake the clutch is engaged, thereby preventing any possibility of the clutch and brake being in engagement at the same time and also minimizing the time loss between the actuation of the trip cylinder and the starting of the machine. However, the time required for the air pressure to release the brake after the brake valve is opened varies with any variations in the pressure of the compressed air supply. Likewise the force applied to the piston 23, and therefore the speed at which the valve stem 17 operates, varies with variations in the pressure of the air supply. Where a spring is employed to return the valve stem 17 the effective actuating pressure to open the valves does not vary in proportion to the variations in the pressure supply line, and as a consequence an increase in the pressure over that for which the valve is initially timed may result in the clutch starting to engage before the brake is fully released, whereas a decrease in pressure causes an excessive delay during the opening of the clutch valve so that excessive slippage of the clutch takes place. By loading the valve stem 17 from the main pressure supply line by means of the reduced cylinder 22 the effective actuating pressure for moving the valves retains a constant ratio to the pressure in the supply line so that the necessary timing between the clutch and the brake is maintained, and at the same time the clutch valve is opened with the maximum possible speed to admit the full line pressure into the clutch and minimize slipping.

In the illustrated embodiment a space 54 is formed below the main piston 23 and above the reduced cylinder 22. If desired this space may be left closed to serve as a cushion to prevent any shock at the end of the travel of the valve stem 17, or it may be provided with one or more bleed openings 55. The openings 55 may be made sufficiently small to enable the air trapped in the space 54 to check or cushion the movement of the stem 17, while at the same time avoiding any possibility of an excessive air pressure being built up in the space 54.

Although a preferred embodiment of the invention has been described in detail, it will be understood that many variations and modifications may be resorted to without departing from the scope of the invention as defined in the following claims. Although the particular construction disclosed is designed for operation with compressed air, it will be understood that the invention is also applicable to other pressure fluids and also to other machines or devices than the particular type of machines specifically referred to.

I claim:

1. In combination, a fluid actuated clutch, a fluid pressure supply, a valve for controlling the admission of pressure fluid from said supply to said clutch, a cylinder in constant communication with said fluid pressure supply having a piston operatively connected to said valve tending to move the same to closed position, and means for opening said valve against the force of said piston.

2. In combination, a fluid pressure clutch, a fluid pressure brake, a source of supply of pressure fluid, valve means arranged when moved to open position to admit pressure fluid from said supply successively to said brake and said clutch, a cylinder in constant communication with said fluid supply having a piston normally urging said valve means to closed position, and a pilot cylinder having a piston arranged to move said valve means to open position against the force of said first named piston.

3. In combination with an intermittently operated machine having a fluid pressure actuated clutch, a fluid pressure supply, a valve for controlling the admission of pressure fluid from said supply to said clutch, means operated by fluid from said fluid pressure supply constantly urging said valve to closed position, means for opening said valve, and means controlled by said machine for holding said valve open and permitting the same to close after a predetermined operation of said machine under the influence of said first-named means.

4. In combination with an intermittently operated machine having a fluid pressure actuated clutch, a fluid pressure supply, a valve for controlling the admission of pressure fluid from said supply to said clutch, means operated by fluid from said fluid pressure supply constantly urging said valve to closed position, means for opening said valve, and a cam on said machine holding said valve open during a predetermined operation thereof and thereafter permitting said valve to close under the influence of said first-named means.

5. In combination with an intermittently operated machine having a fluid pressure actuated clutch, a fluid pressure supply, a clutch valve for controlling the admission of pressure fluid from said supply to said clutch, means operated by fluid from said fluid pressure supply constantly urging said clutch valve to closed position, a fluid actuated motor operatively connected to said clutch valve, a trip valve arranged in one position to admit fluid from said fluid pressure supply to said motor to open said valve and in another position to exhaust said motor, and means controlled by said machine for holding said clutch valve open after the exhausting of said motor and permitting the same to close after a predetermined operation of said machine under the influence of said first-named means.

6. In combination with an intermittently operated machine having a fluid pressure actuated clutch, a fluid pressure supply, a clutch valve for controlling the admission of pressure fluid from said supply to said clutch, means operated by fluid from said fluid pressure supply constantly urging said clutch valve to closed position, a fluid actuated motor operatively connected to said clutch valve, a trip valve arranged in one position to admit fluid from said fluid pressure supply to said motor to open said clutch valve and in another position to exhaust said motor, and a cam on said machine holding said clutch valve open during a predetermined operation of the machine and during the exhausting of said motor, and thereafter permitting said clutch valve to close under the influence of said means.

7. In combination, an energy controlling fluid actuated friction clutch, a source of supply of pressure fluid, a valve for controlling admission of fluid pressure from said supply to said clutch, a cylinder in constant communication with said supply of pressure fluid having a piston urging said valve to closed position, a cylinder of larger cross section than said first named cylinder having a piston arranged to move said valve to open position against the force of said first named piston, and manually controlled means for connecting said second named cylinder to said supply of pressure fluid.

8. In combination, a driving member and a driven member, a fluid actuated friction clutch arranged to couple said driving and driven members, a fluid actuated brake for said driven member, a source of supply of pressure fluid, a clutch valve for controlling the admission of fluid from said supply to said clutch, a brake valve for controlling the admission of fluid from said supply to said brake, a cylinder in constant communication with said supply of pressure fluid having a piston connected to both of said valves constantly urging the same to closed position, a second cylinder of larger cross section than said first named cylinder having a piston connected to both of said valves and arranged to move the same against the force of said first named piston to open first the brake valve to release said brake and thereafter to open said clutch valve to engage said clutch, and manually controlled means for admitting fluid from said supply to said second cylinder.

JOHN H. FRIEDMAN.